United States Patent
Liu et al.

(10) Patent No.: US 10,801,087 B2
(45) Date of Patent: *Oct. 13, 2020

(54) HIGH-STRENGTH AND HIGH-CONDUCTIVITY COPPER ALLOY AND APPLICATIONS OF ALLOY AS MATERIAL OF CONTACT LINE OF HIGH-SPEED RAILWAY ALLOWING SPEED HIGHER THAN 400 KILOMETERS PER HOUR

(71) Applicant: Zhejiang University, Hangzhou (CN)

(72) Inventors: Jiabin Liu, Hangzhou (CN); Yuqing Xu, Hangzhou (CN); Hongtao Wang, Hangzhou (CN); Youtong Fang, Hangzhou (CN); Liang Meng, Hangzhou (CN); Litian Wang, Hangzhou (CN); Yu Tian, Hangzhou (CN)

(73) Assignee: Zhejiang University, Hangzhou (CN)

( * ) Notice: Subject to any disclaimer, the term of this patent is extended or adjusted under 35 U.S.C. 154(b) by 281 days.

This patent is subject to a terminal disclaimer.

(21) Appl. No.: 16/061,027

(22) PCT Filed: May 15, 2017

(86) PCT No.: PCT/CN2017/084338
§ 371 (c)(1),
(2) Date: Jun. 11, 2018

(87) PCT Pub. No.: WO2017/198128
PCT Pub. Date: Nov. 23, 2017

(65) Prior Publication Data
US 2018/0363101 A1    Dec. 20, 2018

(30) Foreign Application Priority Data

May 16, 2016 (CN) .......................... 2016 1 0319172

(51) Int. Cl.
*C22C 9/00* (2006.01)
*C22C 1/03* (2006.01)
*C22F 1/08* (2006.01)
*B60M 1/30* (2006.01)

(52) U.S. Cl.
CPC .................. *C22C 9/00* (2013.01); *C22C 1/03* (2013.01); *C22F 1/08* (2013.01); *B60M 1/30* (2013.01)

(58) Field of Classification Search
CPC .... B60M 1/30; C22C 1/03; C22C 9/00; C22F 1/08
See application file for complete search history.

(56) References Cited

FOREIGN PATENT DOCUMENTS

| | | |
|---|---|---|
| CN | 1417357 A | 5/2003 |
| CN | 1733953 A | 2/2006 |
| CN | 1818109 A | 8/2006 |
| CN | 1856588 A | 11/2006 |
| CN | 1323179 C | 6/2007 |
| CN | 100362596 C | 1/2008 |
| CN | 101531149 A | 9/2009 |
| CN | 101821416 A | 9/2010 |
| CN | 104745989 A | 7/2015 |
| CN | 106086504 A | 11/2016 |
| JP | H04254558 A | 9/1992 |

OTHER PUBLICATIONS

International Search Report from PCT/CN2017084338 dated Aug. 22, 2017.
Written Opinion from PCT/CN2017084338 dated Aug. 22, 2017.

*Primary Examiner* — Jenny R Wu

(57) ABSTRACT

The present invention discloses a super-strong high-conductivity copper alloy and applications thereof as the contact wire materials of high speed railways allowing a speed of over 400 km per hour. The copper alloy comprises niobium, chromium, zirconium, titanium and remaining copper; the copper alloy exists in the form of long bar or wire, wherein niobium is distributed in the copper matrix in the form of nanofibers and solid solution atoms, chromium is distributed around the niobium fibers and the copper matrix in the form of nano-particles and solid solution atoms, zirconium is distributed around the niobium fibers and in the copper matrix in the form of copper-zirconium compound nano-particles and solid solution atoms; titanium is distributed in the copper matrix in the form of copper-titanium GP zone and solid solution atoms; the total amount of niobium, chromium and zirconium solid solution atoms contained in the copper alloy is less than 0.2%.

16 Claims, 1 Drawing Sheet

HIGH-STRENGTH AND HIGH-CONDUCTIVITY COPPER ALLOY AND APPLICATIONS OF ALLOY AS MATERIAL OF CONTACT LINE OF HIGH-SPEED RAILWAY ALLOWING SPEED HIGHER THAN 400 KILOMETERS PER HOUR

RELATED APPLICATIONS

This application is a 35 U.S.C. § 371 national phase application of PCT/CN2017/084338 (WO2017/198128), filed on May 15, 2017 entitled "Super-strong high-conductivity copper alloy used as material for contact line of high-speed railway allowing speed higher than 400 kilomerters per hour", which application claims the benefit of Chinese Application Serial No. 201610319172.4, filed May 16, 2016, which is incorporated herein by reference in its entirety.

FIELD OF THE INVENTION

The present invention relates to a Cu alloy and applications thereof as contact wire materials of high speed railways, in particular, high speed railways at a speed of over 400 km per hour.

BACKGROUND

Since 2009, China's high-speed electrified railways (hereinafter referred to as HSR) have got substantial and leap-forward development. Beijing-Tianjin, Beijing-Shanghai and Beijing-Guangzhou railway lines were opened successively, and the stable running speed of HSR is 300 km/h. There are great market demands and strict performance requirements for the contact wire, a critical component of HSR, due to its development. It is required that materials used as the contact wire shall have all of the following features: high strength, low linear density, good electrical conductivity, good abrasion resistance and corrosion resistance, etc., in particular, strength and conductivity are the most core indexes.

At present, conductor materials adopted for the contact wire are mainly Cu—Mg, Cu—Sn, Cu—Ag, Cu—Sn—Ag, Cu—Ag—Zr, Cu—Cr—Zr and other Cu alloys, among which Cu—Cr—Zr shows a more excellent combination property of strength and conductivity. Patents CN200410060463.3 and CN200510124589.7 disclose the preparation technology of Cu-(0.02~0.4)% Zr-(0.04~0.16)% Ag and Cu-(0.2~0.72)% Cr-(0.07~0.15)% Ag, which is to prepare finished products through smelting, casting, thermal deformation, solid solution, cold deformation, aging and cold deformation again. Patent CN03135758.X discloses a preparation method of using rapid solidification powder processing, compaction, sintering and extrusion to obtain Cu-(0.01~2.5)% Cr-(0.01~2.0)% Zr-(0.01~2.0)%(Y, La, Sm) alloy rods or sheets, which can obtain good electrical conductivity, thermal conductivity, high temperature and softening resistance properties. Patent CN200610017523.2 discloses Cu-(0.05~0.40)% Cr-(0.05~0.2)% Zr-<0.20% (Ce+Y) alloy composition and its preparation technology, which is to obtain high-strength and high-conductivity combination property and good heat resistance and abrasion resistance properties through smelting, casting, solid solution, deformation and aging. Patent CN02148648.4 discloses Cu-(0.01~1.0)% Cr-(0.01~0.6)% Zr-(0.05~1.0)% Zn-(0.01~0.30)% (La+Ce) alloy composition and its preparation technology, which is to obtain relatively high strength and conductivity through smelting, hot rolling, solid solution, cold rolling, aging and finished rolling.

With the continuous development of high-speed electrified railways, China's "13$^{th}$ Five-year Plan" clearly proposes that the high-speed railway system at a speed of over 400 km/h shall be completed by 2020. Thus, the properties of the matching contact wire materials must be improved to such a level: strength>680 MPa, conductivity>78% IACS and the reduction rate of strength after annealing for 2 h at 400° C.<10%. Due to such strict performance standards, Cu—Mg, Cu—Sn, Cu—Ag, Cu—Sn—Ag, Cu—Ag—Zr and Cu—Cr—Zr alloys used currently fail to meet the minimum requirements for the contact wire materials of the high-speed railway system at a speed of over 400 km/h. Therefore, new high-performance alloys must be developed to adapt to the continuous and accelerated development of high-speed railways.

SUMMARY

The object of the present invention is to provide an ultra-strength and high-conductivity copper alloy and applications thereof as the contact wire materials of high speed railways, in particular, high speed railways at a speed of over 400 km per hour.

In order to achieve the above object, the present invention adopts the following technical solutions. The present invention provides a copper alloy, comprising 3%-20% niobium, 0.01%-1% chromium, 0.01%-0.5% zirconium, 0.01%-0.2% titanium by weight percent and remaining copper; the copper alloy exists in the form of long bar or wire, wherein niobium is distributed in the copper matrix in the form of nanofibers and solid solution atoms, and most of niobium nanofibers are arranged approximately in parallel in the copper matrix, these fibers are approximately parallel to copper alloy rods or wires in the axial direction; chromium is distributed around the niobium fibers and the copper matrix in the form of nano-particles and solid solution atoms, zirconium is distributed around the niobium fibers and in the copper matrix in the form of copper-zirconium compound nano-particles and solid solution atoms; titanium is distributed in the copper matrix in the form of copper-titanium GP zone and solid solution atoms; the total amount of niobium, chromium and zirconium solid solution atoms contained in the copper alloy is less than 0.2%; part of chromium and copper zirconium compound nanoparticle are pinned on the phase interface of niobium nanofibers and copper matrix.

Further, the copper alloy is prepared according to the following steps:

(1) Melt the raw materials of simple substance and/or master alloy in a vacuum induction melting furnace and rapidly cast in a water-cooled copper mold with a cooling rate greater than 20° C./s;

(2) Carry out multi-pass drawing of the ingot obtained in the step (1) at room temperature, with a single-time drawing deformation less than 0.3 and ultimately achieving a drawing deformation greater than 3.5;

(3) Anneal the drawn copper alloy rod or wire at 375-575° C. for 1-100 h;

(4) Carry out drawing of the annealed copper alloy again at room temperature, with a single-time drawing deformation at 0.1~0.2 and drawing deformation at 0.5~1.0;

(5) Place the above copper alloy in liquid nitrogen freezing for 12~72 h, then slowly warm to room temperature, with a heating rate less than 10° C./min, to get the copper alloy.

Further, the master alloy in step (1) may be Cu-(10%~25%)Nb master alloy, Cu-(5%~13%)Cr master alloy, Cu-(5%~7%) Zr master alloy, Cu-(3%~10%) Ti master alloy, etc. The percentage content of the elemental content and the copper alloy composition involved in the present invention is represented by mass content and a mass percentage.

Still further, the cooling rate is preferably 30~100° C./s in the step (1).

Further, the single-time drawing deformation is preferably 0.1~0.2, and ultimately a drawing amount of 4 to 6 in step (2).

Still further, the annealing temperature is preferably 400 to 500° C., and the annealing time is preferably 4 to 64 h in step (3).

Still further, the preparation method comprises steps (1) to (5).

The strength of the copper alloy disclosed in the present invention reaches over 800 MPa, its conductivity reaches over 78% IACS and the strength reduction rate<10% after annealing at 400° C. for 2 h, thus reaching the requirements for the contact wire materials of high-speed railway system at a speed of over 400 km/h. Therefore, the present invention further provides the application of the copper alloy as the contact wire materials of high speed railways, in particular, at a speed of over 400 km per hour.

Compared with prior art, the copper alloy disclosed herein can achieve the following beneficial effects.
1. The present invention uses the high density nano-fiber formed by Nb element to effectively hinder the dislocation movement so as to produce a great nano-fiber strengthening effect and improve the overall strength level of the alloy, so that the strength of the copper alloy can reach over 800 MPa;
2. It can reduce the scattering of electron waves on the phase interface by using the roughly parallel relationship between the axial direction of fiber and that of the alloy bar or wire, to ensure the alloy conductivity remains at a higher level and reaches over 78% IACS;
3. By pinning nanoparticles on the phase interface between fiber and copper matrix, it can prevent the spheroidizing trend of nano-fiber during annealing, and ensure the alloy has a very high anti-softening temperature and the strength reduction rate<10% after annealing at 400° C. for 2 h.
4. Strengthen the copper matrix using Copper Titanium spinodal decomposition, to further improve the alloy strength.
5. Desolventize Nb, Cr, Zr, Ti atoms as much as possible using liquid nitrogen low temperature treatment, to form a precipitated phase, which not only improves the alloy strength, but also purifies the copper matrix, reduces solid solution atom scattering effect, and improve the alloy conductivity.

DETAILED DESCRIPTION

Figure 1:
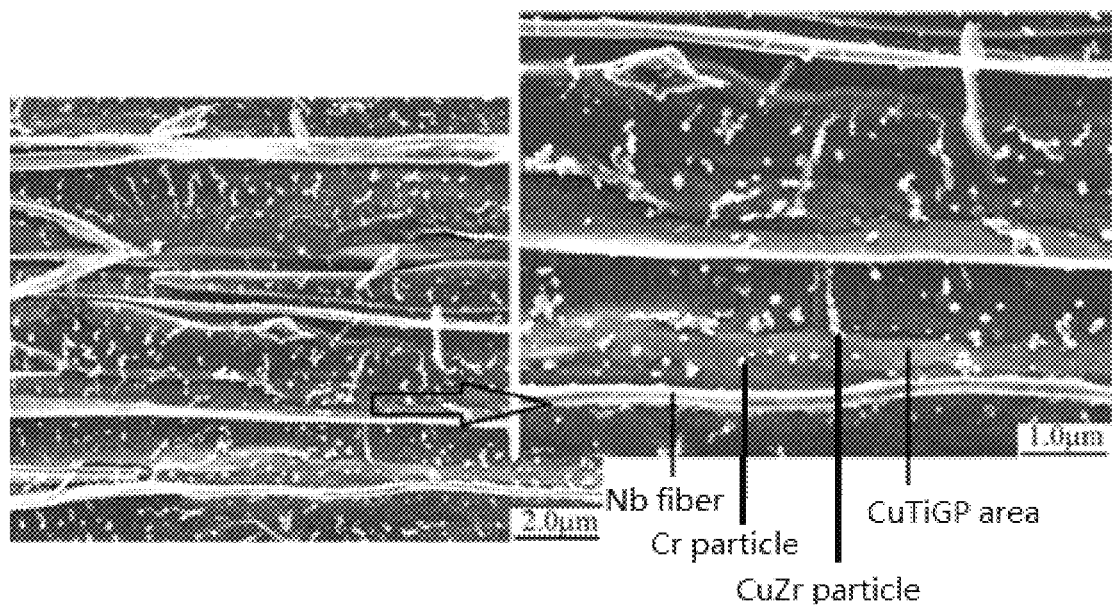
FIG. 1 shows a scanning electron microscope (SEM) graph of the copper alloy microstructure obtained in Example 2 in the present invention.
Figure 2:
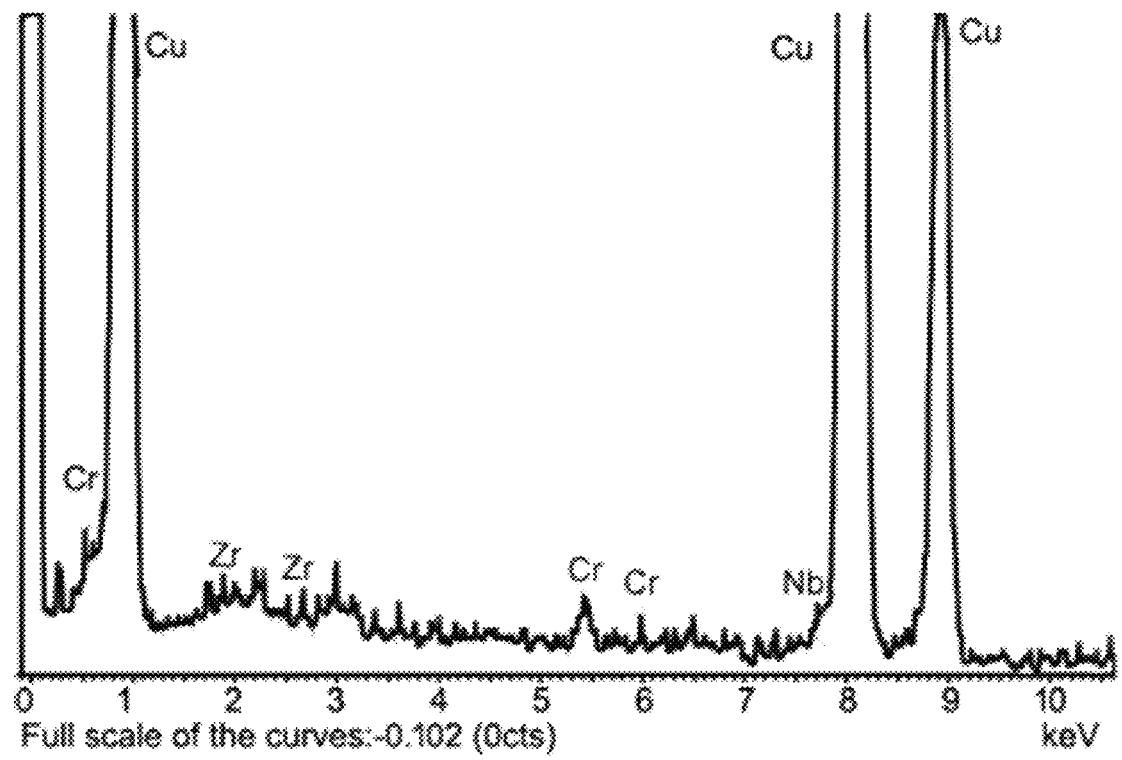
FIG. 2 shows the results of the tested compositions of the copper matrix energy spectra of the copper alloy obtained in Example 1 of the present invention, indicating that the matrix contains a very small amount of Nb, Zr and Cr elements.

The technical solutions of the present invention will be further described with specific embodiments below, but the scope of protection of the present invention is not limited thereto.

Example 1

The raw materials, Cu-25% Nb master alloy, Cu-13% Cr master alloy, Cu-7% Zr master alloy, Cu-10% Ti master alloy, are melted in a vacuum induction melting furnace and rapidly cast on a water-cooled copper mold at a cooling rate of 30° C. Is, to obtain Cu-3% Nb-1% Cr-0.5% Zr-0.2% Ti ingot. The ingots are multi-pass drawn at room temperature, to achieve a single-time drawing deformation at 0.15 and eventually at a drawing deformation amount of 5.5. The drawn copper alloy rod or wire is annealed at 375° C. for 100 h. The annealed copper alloy is drawn again at room temperature, at a drawing deformation of 0.5. The above copper alloy is placed in liquid nitrogen freezing for 72 h, then slowly heated to room temperature at a heating rate of 5/min. The tensile strength of the alloy is tested by a standard tensile test. The standard four-point method is used to test the room temperature conductivity of the alloy. The alloy is annealed at 400° C. for 2 h, to conduct a softening test and test its strength reduction rate.

Example 2

The raw materials, Cu-10% Nb master alloy, Cu-5% Cr master alloy, Cu-5% Zr master alloy, Cu-3% Ti master alloy, are melted in a vacuum induction melting furnace and rapidly cast on a water-cooled copper mold at a cooling rate of 50° C./s, to obtain Cu-10% Nb-0.5% Cr-0.3% Zr-0.1% Ti ingot. The ingots are multi-pass drawn at room temperature, to achieve a single-time drawing deformation at 0.1 and eventually at a drawing deformation amount of 6.0. The drawn copper alloy rod or wire is annealed at 450° C. for 10 h. The annealed copper alloy is drawn again at room temperature, at a drawing deformation of 0.5. The above copper alloy is placed in liquid nitrogen freezing for 48 h, then slowly heated to room temperature at a heating rate of 2° C./min. The tensile strength of the alloy is tested by a standard tensile test. The standard four-point method is used to test the room temperature conductivity of the alloy. The alloy is annealed at 400° C. for 2 h, to conduct a softening test and test its strength reduction rate.

Example 3

The raw materials, Cu-20% Nb master alloy, Cu-10% Cr master alloy, Cu-6% Zr master alloy, Cu-5% Ti master alloy, are melted in a vacuum induction melting furnace and rapidly cast on a water-cooled copper mold at a cooling rate of 100° C. Is, to obtain Cu-20% Nb-0.1% Cr-0.1% Zr-0.05% Ti ingot. The ingots are multi-pass drawn at room temperature, to achieve a single-time drawing deformation at 0.2 and eventually at a drawing deformation amount of 4. The drawn copper alloy rod or wire is annealed at 575° C. for 1 h. The annealed copper alloy is drawn again at room temperature, at a drawing deformation of 0.5. The above copper alloy is placed in liquid nitrogen freezing for 12 h, then slowly heated to room temperature at a heating rate of 8° C./min. The tensile strength of the alloy is tested by a standard tensile test. The standard four-point method is used to test the room temperature conductivity of the alloy. The alloy is annealed at 400° C. for 2 h, to conduct a softening test and test its strength reduction rate.

For the alloy obtained in the above examples, the contents of Nb, Cr and Zr solid solution atoms in the copper matrix are tested by high-resolution spectroscopy. The content of Ti solid solution atom cannot be determined due to unable to be distinguished from the copper-titanium GP area in the energy spectrum, but according to the performance results, its content should be very low. Results are shown in Table 1.

TABLE 1

The contents of Nb, Cr and Zr solid solution atoms in the copper matrix of the alloy in the examples

| Alloy | Content of Nb solid solution atom (%) | Content of Cr solid solution atom (%) | Zr固溶原子含量 (%) |
|---|---|---|---|
| Cu—3% Nb—1% Cr—0.5% Zr—0.2% Ti | 0.04 | 0.05 | 0.04 |
| Cu—10% Nb—0.5% Cr—0.3% Zr—0.1% Ti | 0.05 | 0.03 | 0.03 |
| Cu—20% Nb—0.1% Cr—0.1% Zr—0.05% Ti | 0.05 | 0.02 | 0.02 |

TABLE 2

Main performances of alloys

| Alloy | Strength (MPa) | Conductivity (% IACS) | Stength reducio nrate under 400° C. for annealing for 2 h |
|---|---|---|---|
| Cu—3% Nb—1% Cr—0.5% Zr—0.2% Ti | 800 | 81 | 8% |
| Cu—10% Nb—0.5% Cr—0.3% Zr—0.1% Ti | 850 | 79 | 5% |
| Cu—20% Nb—0.1% Cr—0.1% Zr—0.05% Ti | 880 | 78 | 3% |
| Reference alloy CuCrZrZnCoTiLa* | 608.2 | 70 | 无 |

*Data of reference alloy CuCrZrZnCoTiLa are from patent CN1417357A.

What is claimed is:

1. A copper alloy, comprising 3 wt %-20 wt % niobium, 0.01 wt %-0.1 wt chromium, 0.01 wt %-0.5 wt % zirconium, 0.01 wt %-0.2 wt % titanium and remaining copper; the copper alloy exists in the form of a bar or a wire, wherein niobium is distributed in the copper matrix in the form of nanofibers and solid solution atoms, and most of niobium nanofibers are arranged approximately in parallel in the copper matrix, these fibers are approximately parallel to copper alloy rods or wires in the axial direction; chromium is distributed around the niobium fibers and the copper matrix in the form of nano-particles and solid solution atoms, zirconium is distributed around the niobium fibers and in the copper matrix in the form of copper-zirconium compound nanoparticles and solid solution atoms; titanium is distributed in the copper matrix in the form of copper-titanium GP zone and solid solution atoms; the total amount of niobium, chromium and zirconium solid solution atoms contained in the copper alloy is less than 0.2%; part of chromium and copper zirconium compound nanoparticle are pinned on the phase interface of niobium nanofibers and copper matrix.

2. The copper alloy according to claim 1, wherein the strength of the copper alloy reaches over 800 MPa, its conductivity reaches over 78% IACS and the strength reduction rate<10% after annealing at 400° C. for 2 h.

3. The copper alloy according to claim 1, wherein the copper alloy is prepared according to the following steps:
   (1) Melting raw materials of simple substance and/or master alloy in a vacuum induction melting furnace and rapidly casting in a water-cooled copper mold with a cooling rate greater than 20° C./s;
   (2) Carrying out multi-pass drawing of an ingot obtained in the step (1) at room temperature, with a single-time drawing deformation less than 0.3 and ultimately achieving a drawing deformation greater than 3.5;
   (3) Annealing a drawn copper alloy rod or wire at 375-575° C. for 1-100 h;
   (4) Carrying out drawing of the annealed copper alloy again at room temperature, with a single-time drawing deformation at 0.1-0.2 and drawing deformation at 0.5-1.0;
   (5) Placing the above copper alloy in liquid nitrogen freezing for 12-72 h, then slowly warming to room temperature, with a heating rate less than 10° C./min, to get the copper alloy.

4. The copper alloy according to claim 3, wherein the master alloy in step (1) is one or more from Cu-(10 wt %~25 wt %)Nb master alloy, Cu-(5 wt %~13 wt %)Cr master alloy, Cu-(5 wt %~7 wt %)Zr master alloy, Cu-(3 wt %~10 wt %)Ti master alloy.

5. The copper alloy according to claim 3, wherein the cooling rate is 30-100° C./s in the step (1).

6. The copper alloy according to claim 3, wherein the single-time drawing deformation is 0.1-0.2, and ultimately a drawing amount of 4 to 6 in step (2).

7. The copper alloy according to claim 3, wherein the annealing is performed at a temperature of 400 to 500° C. for 4 to 64 h in step (3).

8. The copper alloy according to claim 3, wherein the preparation method comprises steps (1) to (5).

9. Applications of the copper alloy according to claim 1 as contact wire materials of high speed railways.

10. The applications according to claim 9, wherein the speed of the high speed railways is over 400 km per hour.

11. The copper alloy according to claim 2, wherein the copper alloy is prepared according to the following steps:
   (1) Melting the raw materials of simple substance and/or master alloy in a vacuum induction melting furnace and rapidly casting in a water-cooled copper mold with a cooling rate greater than 20° C./s;
   (2) Carrying out multi-pass drawing of an ingot obtained in the step (1) at room temperature, with a single-time drawing deformation less than 0.3 and ultimately achieving a drawing deformation greater than 3.5;
   (3) Annealing a drawn copper alloy rod or wire at 375-575° C. for 1-100 h;
   (4) Carrying out drawing of the annealed copper alloy again at room temperature, with a single-time drawing deformation at 0.1-0.2 and drawing deformation at 0.5-1.0;
   (5) Placing the above copper alloy in liquid nitrogen freezing for 12-72 h, then slowly warming to room temperature, with a heating rate less than 10° C./min, to get the copper alloy.

12. The copper alloy according to claim 11, wherein the master alloy in step (1) is one or more from Cu-(10 wt %~25 wt %)Nb master alloy, Cu-(5 wt %~13 wt %)Cr master alloy, Cu-(5 wt %~7 wt %)Zr master alloy, Cu-(wt 3%~10 wt %)Ti master alloy.

13. The copper alloy according to claim 11, wherein the cooling rate is 30-100° C./s in the step (1).

14. The copper alloy according to claim 11, wherein the single-time drawing deformation is 0.1-0.2, and ultimately a drawing amount of 4 to 6 in step (2).

15. The copper alloy according to claim 11, wherein the annealing is performed at a temperature of 400 to 500° C., for 4 to 64 h in step (3).

16. The copper alloy according to claim 11, wherein the preparation method comprises steps (1) to (5).

* * * * *